United States Patent
Yoo et al.

(10) Patent No.: US 8,262,937 B2
(45) Date of Patent: Sep. 11, 2012

(54) GREEN PHOSPHOR FOR PLASMA DISPLAY PANEL AND PLASMA DISPLAY PANEL INCLUDING SAME

(75) Inventors: Young-Gil Yoo, Yongin-si (KR); Young-Kwan Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/870,765

(22) Filed: Aug. 27, 2010

(65) Prior Publication Data
US 2011/0121716 A1 May 26, 2011

(30) Foreign Application Priority Data
Nov. 26, 2009 (KR) .................. 10-2009-0115319

(51) Int. Cl.
*C09K 11/72* (2006.01)
*H01J 29/10* (2006.01)

(52) U.S. Cl. .................. 252/301.6 R; 313/486
(58) Field of Classification Search ........... 252/301.4 R, 252/301.6 R; 313/467, 468, 486, 495, 497
See application file for complete search history.

(56) References Cited

U.S. PATENT DOCUMENTS

| | | | |
|---|---|---|---|
| 7,659,668 B2 | 2/2010 | Toyoda et al. | |
| 2007/0182300 A1* | 8/2007 | Youh et al. | 313/112 |
| 2008/0012467 A1* | 1/2008 | Negishi | 313/495 |
| 2008/0203901 A1* | 8/2008 | Bukesov et al. | 313/503 |
| 2008/0315749 A1* | 12/2008 | Kwon | 313/486 |
| 2009/0020897 A1* | 1/2009 | Winkler et al. | 264/1.22 |
| 2009/0206724 A1* | 8/2009 | Kim et al. | 313/486 |
| 2010/0061077 A1* | 3/2010 | Winkler et al. | 362/84 |

FOREIGN PATENT DOCUMENTS

| | | |
|---|---|---|
| JP | 2005-213421 | 8/2005 |
| KR | 10-20010039371 | 5/2001 |
| KR | 10-0592310 B1 | 6/2006 |
| KR | 10-2006-0082527 | 7/2006 |
| KR | 10-2008-0107484 | 12/2008 |
| KR | 10-2009-0084466 A * | 8/2009 |
| KR | 10-2009-0084466A * | 8/2009 |
| WO | WO 2007098838 A1 * | 9/2007 |

OTHER PUBLICATIONS

European Search Report dated Dec. 27, 2010, for corresponding European Patent application 10176563.4, noting references previously filed in an IDS dated Dec. 23, 2010.
European Search Report dated Nov. 4, 2010, for corresponding European Patent application 10176563.4, noting listed references in this IDS.
Kojima, T: *Phosphor for plasma display*, Shionoya, et al., "Phosphor Handbook" 1999, CRC Press LLC, XP002604990, pp. 623-629.
Korean Patent Abstract for Publication No. KR 10-2006-0053317 A, published May 22, 2006, corresponding to Patent No. KR 10-0592310, listed above, 1 sht.

* cited by examiner

*Primary Examiner* — Emily Le
*Assistant Examiner* — Lynne Edmondson
(74) *Attorney, Agent, or Firm* — Christie, Parker & Hale, LLP

(57) ABSTRACT

A green phosphor for a plasma display panel and a plasma display panel including the same, the green phosphor including a first phosphor of $YAl_5O_{12}$:Ce, and a second phosphor of $Zn_{1-x}Mg_x(Ga_{1-y}Al_y)_2O_4$:Mn, wherein $0 \leq x < 1$, $0 \leq y < 1$.

14 Claims, 1 Drawing Sheet

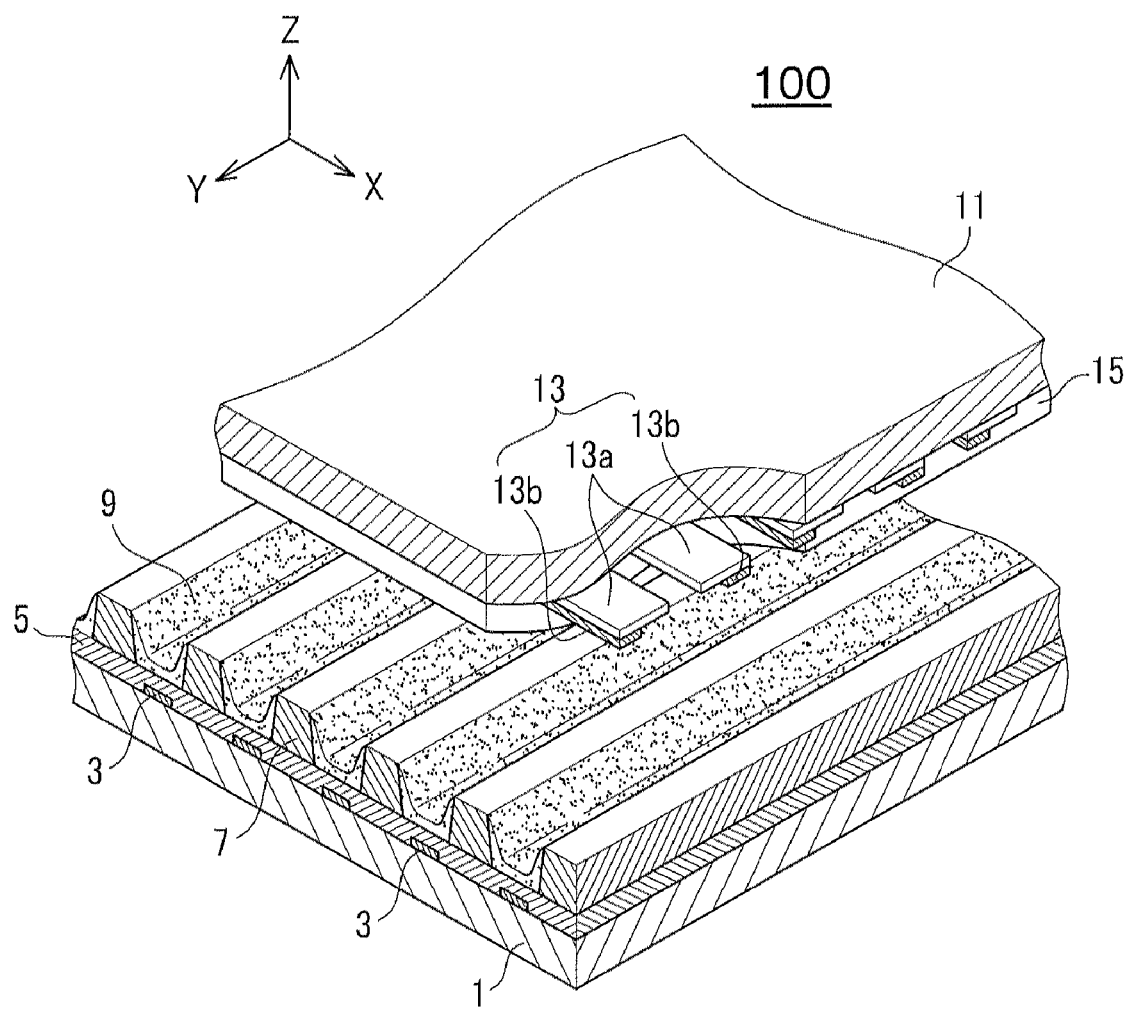

GREEN PHOSPHOR FOR PLASMA DISPLAY PANEL AND PLASMA DISPLAY PANEL INCLUDING SAME

CROSS-REFERENCE TO RELATED APPLICATION

This application claims the benefit of Korean Patent Application No. 10-2009-0115319, filed Nov. 26, 2009, in the Korean Intellectual Property Office, the disclosure of which is incorporated herein, by reference.

BACKGROUND

1. Field

This disclosure relates to a green phosphor for a plasma display panel (PDP) and a PDP including the same.

2. Description of the Related Art

A conventional green phosphor used in a plasma display panel (PDP) generally includes $Zn_2SiO_4$:Mn, $YBO_3$:Tb, or an appropriate mixture thereof. Alternatively, a conventional green phosphor may include $BaMgAl_{10}O_{17}$:Mn (or $BaMgAl_{12}O_{19}$:Mn) and $Li_2Zn(Ge,\theta)_zO_8$:Mn, $\theta$=Al, Ga, $3 \leq Z \leq 4$, in order to improve color purity; or it includes $Y_{(1-x)}Gd_xAl_3(BO_3)_4$:Tb ($0<x\leq 1$), in order to improve brightness saturation. Although such phosphors have above-mentioned merits, such phosphors have decay times ranging from 5 ms to 15 ms, which are too slow to satisfy the needs of many plasma display panel (PDP) devices.

Developing a green phosphor having a short decay time is important for plasma display panels, because the human eye is relatively more sensitive to green color wavelengths, giving green colors a higher apparent brightness in displayed images. In addition, much research is being conducted with regard to green phosphors having a short decay time, for use in virtual three-dimensional stereoscopic multimedia, which can be applied to telecommunication, broadcast, medical, education, training, military, gaming, animation, virtual reality, CAD, industrial technology, and the like.

SUMMARY

One aspect of this disclosure provides a green phosphor for a plasma display panel having excellent color purity as well as a decreased decay time.

Another aspect of this disclosure provides a plasma display panel including the green phosphor.

According to aspect of this disclosure, a green phosphor for a plasma display panel is provided that includes a first phosphor of $Y_3Al_5O_{12}$:Ce, and a second phosphor represented the following Chemical Formula 1.

$Zn_{1-x}Mg_x(Ga_{1-y}Al_y)_2O_4$:Mn  [CHEMICAL FORMULA 1]

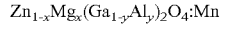

In the above Chemical Formula 1, $0 \leq x<1$, and $0 \leq y<1$.

According to various aspects, the first phosphor and second phosphor may be mixed at a weight ratio of about 70:30 wt % to about 40:60 wt %, or about 70:30 wt % to about 50:50 wt %.

According to various aspects, the second phosphor may include $ZnGa_2O_4$:Mn.

According to various aspects, the green phosphor has CIE color coordinates of $0.18 \leq x \leq 0.28$ and $0.60 \leq y \leq 0.75$, or CIE color coordinates of $0.18 \leq x \leq 0.275$ and $0.60 \leq y \leq 0.71$.

According to various aspects, the green phosphor can be used in a plasma display panel that produces three-dimensional stereoscopic images.

According to various aspects, the phosphor has a decay time of about 1 ms or less, or about 0.5 ms to about 1 ms.

According to another aspect of this disclosure, a plasma display panel including the green phosphor is provided.

According to various aspects, the green phosphor has a short decay time and good color reproduction properties, and thereby, it can be applied to a plasma display panel to realize a three-dimensional stereoscopic image.

Additional aspects and/or advantages of the present disclosure will be set forth in part in the description which follows and, in part, will be obvious from the description, or may be learned by practice of the present disclosure.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which:

FIG. 1 is a schematic view of a plasma display panel according to one embodiment.

DETAILED DESCRIPTION

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

One exemplary embodiment of the present disclosure provides a green phosphor for a plasma display panel, having a shorter decay time than that of a red or blue phosphor, since the human eye has a higher sensitivity to green wavelengths, making green colors appear to have a higher brightness.

According to one exemplary embodiment, a green phosphor is provided that is excitable by a vacuum ultraviolet (VUV) rays and includes a first phosphor of $Y_3Al_5O_{12}$:Ce and a second phosphor represented by the following Chemical Formula 1.

$Zn_{1-x}Mg_x(Ga_{1-y}Al_y)_2O_4$:Mn  [CHEMICAL FORMULA 1]

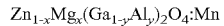

In the above Chemical Formula 1, $0 \leq x<1$, $0 \leq y<1$. When x is 0 and y is 0, the second phosphor is $ZnGa_2O_4$:Mn.

The first phosphor has a decay time of 1 ms or less, which is applicable for 3-D (three-dimensional stereoscopic) image realization. Further, the second phosphor has excellent color purity, due having a main wavelength of 530 nm or less.

When the first phosphor and the second phosphor are mixed, the decay time of the resultant green phosphor may be shortened due to the first phosphor, and its color purity may be improved due to the second phosphor. Therefore, when the green phosphor is applied to 3-D image display devices, which generally use phosphors having short decay times, the 3-D image and color reproduction characteristics thereof may be improved, due to the color purity of the green phosphor.

The mixing ratio of the first phosphor and the second phosphors may be about 70:30 wt %, to about 40:60 wt %, when considering luminance, color reproduction characteristics, decay times, and so on. In particular, the mixing ratio of the first phosphor and the second phosphor may range from about 70:30 wt %, to about 50:50 wt %. In another exemplary embodiment, the mixing ratio may range from about 70:30 wt %, to about 55:45 wt %. When the mixing ratio of the first phosphor and the second phosphor is within the present ranges, the green phosphor exhibits a suitable decay time, luminance, and color reproduction characteristics.

Since the green phosphor has a short decay time and no brightness decrease, it may be applied to a high performance plasma display panel (PDP), such as a PDP driven at 120 Hz or more. According to another exemplary embodiment, the green phosphor is applicable to a display driven at 160 Hz, or a 3-D display device. Particularly, the green phosphor has a decay time of 1 ms or less, and particularly, 0.5 ms to 1 ms, so as to be well suited for use in a 3-D display device (a device that forms a three-dimensional stereoscopic image).

The green phosphor has color coordinates of $0.18 \leq x \leq 0.28$, and $0.60 \leq y \leq 0.75$, in the International Commission on Illumination (CIE) color space. In one embodiment, the green phosphor has CIE color coordinates of $0.18 \leq x \leq 0.275$, and $0.60 \leq y \leq 0.71$, so as to have excellent color purity.

FIG. 1 is a partial exploded perspective view of a plasma display panel 100 including the green phosphor, according to another exemplary embodiment of the present disclosure. As shown in FIG. 1, the plasma display panel 100 includes a first substrate 1 (rear substrate) and an opposing second substrate 11 (front substrate).

On the surface of the first substrate 1, a plurality of address electrodes 3 are disposed in one direction (the Y direction in the drawing). A first dielectric layer 5 is disposed covering the address electrodes 3. A plurality of barrier ribs 7 are formed on the first dielectric layer 5, between the address electrodes 3, to form discharge spaces.

The barrier ribs 7 may be formed in any shape, as long as they can suitably form the discharge spaces. In particular, the barrier ribs 7 may have diverse patterns. For example, the barrier ribs 7 may be formed in an open-type pattern, such as a striped pattern, or as a closed-type pattern, such as a waffle, matrix, or delta pattern. The closed-type barrier ribs may be formed such that a horizontal cross-section of the discharge spaces is a polygon, such as a quadrangle, a triangle, or a pentagon, or a circle, or an oval.

Red (R), green (G), and blue (B) phosphor layers 9 are disposed in discharge cells 7R, 7G, and 7B formed between the barrier ribs 7. The green phosphor layer 7G includes the above green phosphor.

Display electrodes 13 are formed on a surface of the second substrate 11 that faces the first substrate 1. Each display electrode 13 includes a pair of transparent electrodes 13a and a pair of bus electrodes 13b. The display electrodes 13 extend across the address electrodes 3 (in the X direction in the drawing). A dielectric layer 15 is disposed on the second substrate 11, so as to cover the display electrodes 13. Discharge cells are formed at intersections of the address electrodes 3 and the display electrodes 13, which are filled with a discharge gas.

An address discharge is formed by applying an address voltage (Va) between the address electrodes 3 and a corresponding discharge sustain electrode 13. When a sustain voltage (Vs) is applied to the display electrodes 13, the discharge gas is excited, thereby generating ultraviolet (UV) light. The UV light may be Vacuum UV light (40-190 nm). The UV light excites the phosphor layer 9, which then emits visible light through the transparent second substrate 11.

The following examples illustrate this disclosure in more detail. The scope of this disclosure is not limited by the following examples, however.

Examples 1 to 4

Green phosphors were prepared that included a first phosphor of $Y_3Al_5O_{12}$:Ce and a second phosphor of $ZnGa_2O_4$:Mn, in the amounts shown in the following Table 1. The brightness, color coordinates, and decay times of each of the prepared phosphors were measured. The results are provided in the following Table 1.

TABLE 1

| | Composition (wt %) | | | CIE color coordinate | | | |
|---|---|---|---|---|---|---|---|
| | Second phosphor ($ZnGa_2O_4$:Mn) | First phosphor ($Y_3Al_5O_{12}$:Ce) | Luminance (L: cd/m²) | x | y | Decay time (ms) | Color purity |
| Example 1 | 30 | 70 | 117 | 0.273 | 0.602 | 0.52 | ○ |
| Example 2 | 40 | 60 | 113 | 0.260 | 0.617 | 0.54 | ○ |
| Example 3 | 50 | 50 | 110 | 0.245 | 0.633 | 0.57 | ○ |
| Example 4 | 60 | 40 | 107 | 0.228 | 0.652 | 0.60 | ○ |

As shown in the Table 1, the phosphors of Examples 1 to 4 have decay times of 1 ms or less, and excellent brightness. The phosphors have excellent color purity characteristics (CIE color coordinates of x<0.300 and y>0.600 and particularly, of $0.18 \leq x \leq 0.28$ and $0.60 \leq y \leq 0.75$). Therefore, the phosphors of Examples 1-4 can be used in a display device to form a 3-D image, without substantially producing a smear of residual green color.

Comparative Examples 1 and 2

According to the composition of the following Table 2, green phosphors were prepared by mixing a first phosphor of $Y_3Al_5O_{12}$:Ce and a second phosphor of $Zn_2SiO_4$:Mn. Brightness, color coordinates, and decay times of the comparative phosphors were measured. The results are provided in the following Table 2.

TABLE 2

| | Composition (wt %) | | Luminance | CIE color coordinate | | Decay | Color |
|---|---|---|---|---|---|---|---|
| | Second phosphor ($Zn_2SiO_4$:Mn) | First phosphor ($Y_3Al_5O_{12}$:Ce) | (L: cd/m$^2$) | x | y | time (ms) | purity |
| Comparative Example 1 | 30 | 70 | 107 | 0.297 | 0.587 | 3.51 | X |
| Comparative Example 2 | 40 | 60 | 105 | 0.301 | 0.604 | 4.57 | ○ |

As shown in the Table 2, Comparative Example 1, using $Zn_2SiO_4$:Mn as the second phosphor, has unsatisfactory color purity. Comparative Example 2 has a very long decay time of 4.57 ms, as compared with those of Examples 1 to 4. Therefore, the comparative phosphors are not appropriate for a plasma display panel (PDP) that forms 3-D images.

Comparative Example 3

A $Y_3Al_5O_{12}$:Ce phosphor was used as a green phosphor.

Comparative Example 4

A $ZnGa_2O_4$:Mn phosphor was used as a green phosphor.

Relative brightness, color coordinates, and decay times of the phosphors of Comparative Examples 3 and 4 were measured. The results are provided in the following Table 3. The relative luminance was calculated based on 100% of the luminance of $Zn_2SiO_4$:Mn.

TABLE 3

| | Phosphor | Relative luminance (%) | CIE color coordinate | | Decay time (ms) |
|---|---|---|---|---|---|
| | | | x | y | |
| Comparative Example 3 | $Y_3Al_5O_{12}$: Ce | 110 | 0.306 | 0.5661 | <1 ms (0.64 ms) |
| Comparative Example 4 | $ZnGa_2O_4$: Mn | 70.8 | 0.1344 | 0.7552 | <1 ms (0.87 ms) |

As shown in the Table 3, when the first and second phosphors are independently used, both of the brightness and the color purity characteristics cannot be satisfied.

Although a few exemplary embodiments of the present disclosure have been shown and described, it would be appreciated by those skilled in the art that changes may be made in these exemplary embodiments, without departing from the principles and spirit of the present disclosure, the scope of which is defined in the claims and their equivalents.

What is claimed is:

1. A green phosphor for a plasma display panel comprising:
a first phosphor of $Y_3Al_5O_{12}$:Ce, and
a second phosphor comprising $ZnGa_2O_4$:Mn,
wherein a weight ratio of the first phosphor to the second phosphor ranges from about 70:30 wt %, to about 40:60 wt %.

2. The green phosphor of claim 1, wherein a weight ratio of the first phosphor to the second phosphor ranges from about 70:30 wt %, to about 50:50 wt %.

3. The green phosphor of claim 1, wherein the green phosphor has CIE color coordinates of $0.18 \leq x \leq 0.28$ and $0.60 \leq y \leq 0.75$.

4. The green phosphor of claim 1, wherein the green phosphor has CIE color coordinates of $0.18 \leq x \leq 0.275$ and $0.60 \leq y \leq 0.71$.

5. The green phosphor of claim 1, wherein:
the second phosphor consists of $ZnGa_2O_4$:Mn; and
a weight ratio of the first phosphor to the second phosphor ranges from about 70:30 wt %, to about 50:50 wt %.

6. The green phosphor of claim 1, wherein the phosphor has a decay time of less than about 1 ms.

7. The green phosphor of claim 1, wherein the phosphor has a decay time of about 0.5 ms to about 1 ms.

8. A plasma display panel comprising:
a green phosphor comprising:
a first phosphor of $Y_3Al_5O_{12}$:Ce; and
a second phosphor comprising $ZnGa_2O_4$:Mn,
wherein a weight ratio of the first phosphor to the second phosphor ranges from about 70:30 wt %, to about 40:60 wt %.

9. The plasma display panel of claim 8, wherein a weight ratio of the first phosphor to the second phosphor ranges from about 70:30 wt %, to about 50:50 wt %.

10. The plasma display panel of claim 8, wherein the green phosphor has CIE color coordinates of $0.18 \leq x \leq 0.28$ and $0.60 \leq y \leq 0.75$.

11. The plasma display panel of claim 8, wherein the green phosphor has CIE color coordinates of $0.18 \leq x \leq 0.275$ and $0.60 \leq y \leq 0.71$.

12. The plasma display panel of claim 8, wherein the plasma display panel produces a three-dimensional stereoscopic image.

13. The plasma display panel of claim 8, wherein the green phosphor has a decay time of less than about 1 ms.

14. The plasma display panel of claim 8, wherein the green phosphor has a decay time of about 0.5 ms to about 1 ms.

* * * * *